(12) United States Patent
Castel et al.

(10) Patent No.: US 11,822,147 B2
(45) Date of Patent: Nov. 21, 2023

(54) FASTENING OF A MIRROR TO A SUPPORT

(71) Applicant: AIRBUS DEFENCE AND SPACE SAS, Toulouse (FR)

(72) Inventors: Didier Castel, Toulouse (FR); Frédéric Chaumeil, Toulouse (FR); Lionel Carminati, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 17/926,554

(22) PCT Filed: May 11, 2021

(86) PCT No.: PCT/FR2021/050814
§ 371 (c)(1),
(2) Date: Nov. 18, 2022

(87) PCT Pub. No.: WO2021/234247
PCT Pub. Date: Nov. 25, 2021

(65) Prior Publication Data
US 2023/0204905 A1    Jun. 29, 2023

(30) Foreign Application Priority Data
May 20, 2020   (FR) ...................................... 2005321

(51) Int. Cl.
*G02B 7/183*   (2021.01)

(52) U.S. Cl.
CPC .................................... *G02B 7/183* (2013.01)

(58) Field of Classification Search
CPC ........ G02B 7/183; G02B 7/185; G02B 7/192; G02B 7/198

USPC ................................ 359/846, 847, 849, 872
See application file for complete search history.

(56) References Cited

U.S. PATENT DOCUMENTS

| 4,655,563 A | | 4/1987 | Plante et al. | |
|---|---|---|---|---|
| 4,726,671 A | * | 2/1988 | Ahmad ................ | G02B 7/1825 359/848 |
| 5,004,205 A | * | 4/1991 | Brown ................. | G02B 7/1825 403/57 |
| 5,949,593 A | * | 9/1999 | Lloyd .................... | G02B 7/183 359/849 |

(Continued)

FOREIGN PATENT DOCUMENTS

| FR | 2 773 890 | 7/1999 |
|---|---|---|
| WO | 2008/122313 | 10/2008 |

OTHER PUBLICATIONS

International Search Report with English Translation for PCT/FR2021/050814, dated Aug. 6, 2021, 5 pages.

(Continued)

*Primary Examiner* — Ricky D Shafer
(74) *Attorney, Agent, or Firm* — Nixon & Vanderhye P.C.

(57) ABSTRACT

A system for fastening a mirror to a support is disclosed including intermediate structures, for example bipod structures. At least some of the intermediate structures are provided with torsion devices making it possible to at least partially compensate for optical aberrations of an instrument that includes the mirror. Each torsion device may comprise an elastic element and a variator. The variator is designed to control a deformation of the elastic element, resulting in a torque which is applied to the mirror.

13 Claims, 6 Drawing Sheets

(56) References Cited

U.S. PATENT DOCUMENTS

| | | | | |
|---|---|---|---|---|
| 6,402,329 B1* | 6/2002 | Bailly | ............... | G02B 7/1822 |
| | | | | 359/872 |
| 6,850,675 B1* | 2/2005 | Calvet | ............... | G02B 7/008 |
| | | | | 359/872 |
| 7,242,537 B2* | 7/2007 | Weber | ............... | G03F 7/70833 |
| | | | | 359/223.1 |
| 7,515,359 B2* | 4/2009 | Kugler | ............... | G03F 7/70825 |
| | | | | 359/813 |
| 7,813,033 B1* | 10/2010 | Blanding | ............ | G02B 6/4226 |
| | | | | 359/328 |
| 9,862,322 B2* | 1/2018 | Englander | ............ | B60R 1/0605 |
| 10,161,561 B2* | 12/2018 | Kurose | ............... | G02B 7/00 |
| 2014/0268380 A1 | 9/2014 | Szilagyi | | |

OTHER PUBLICATIONS

Written Opinion of the ISA for PCT/FR2021/050814, dated Aug. 6, 2021, 5 pages.

* cited by examiner

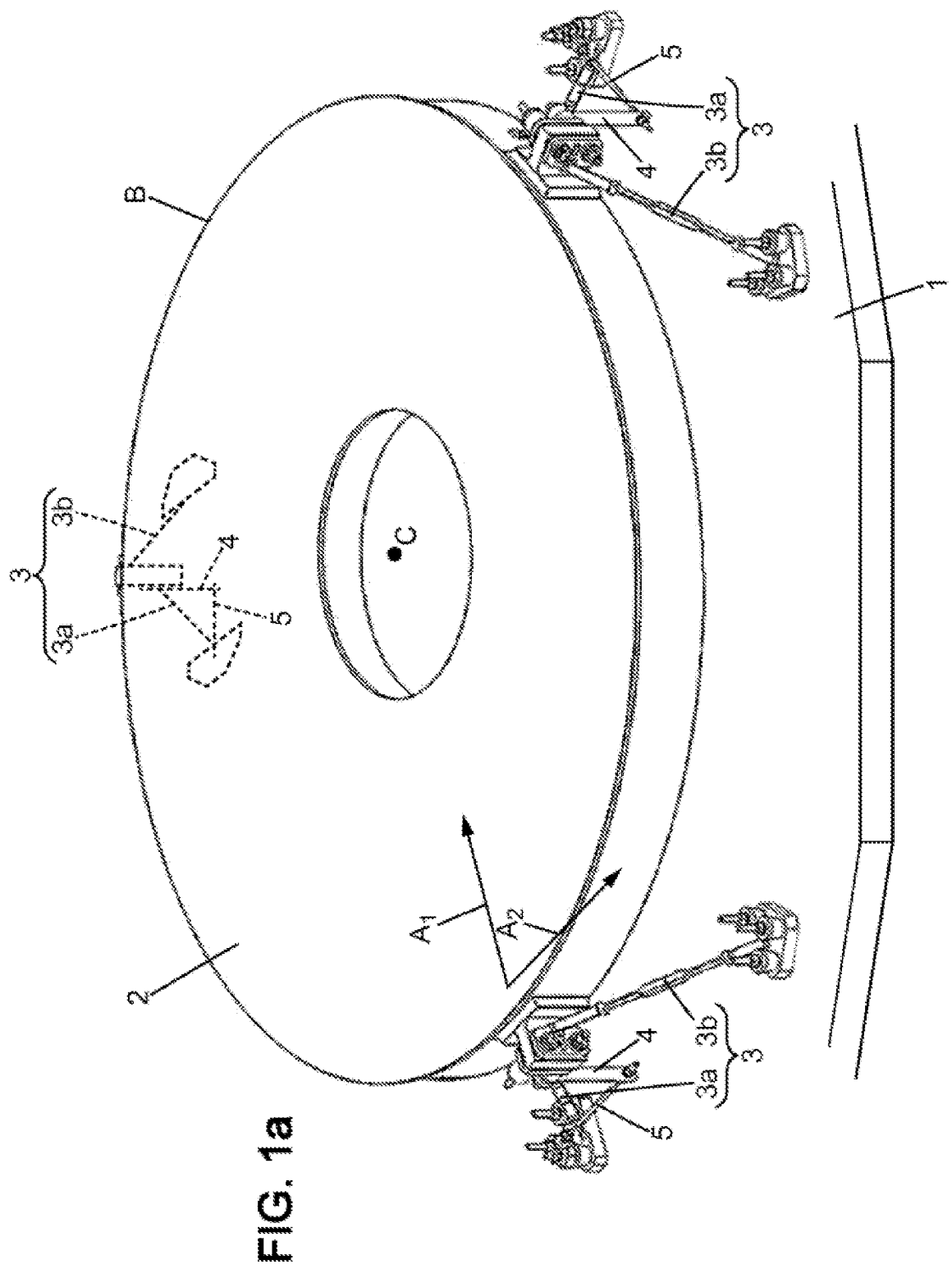

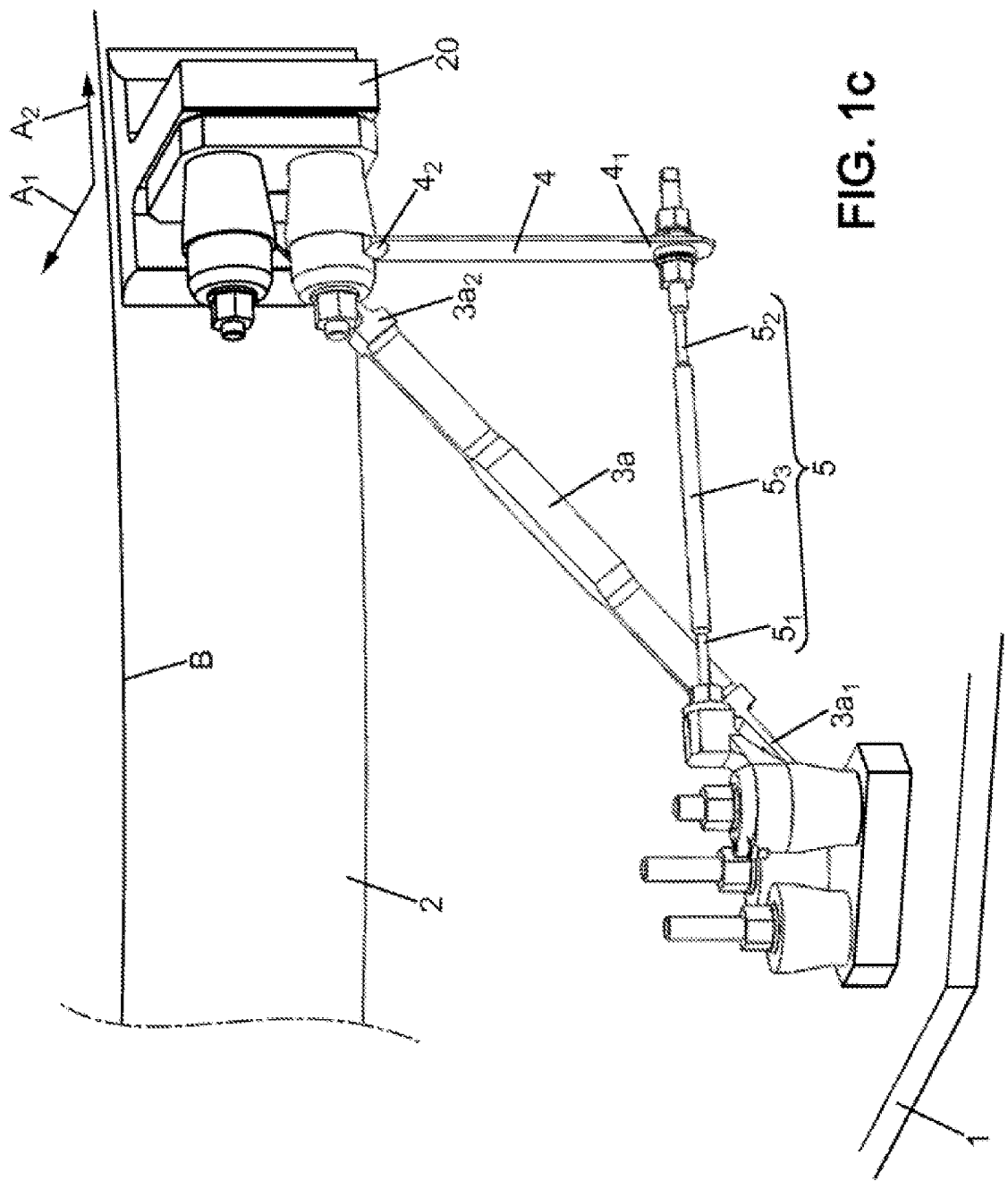

FASTENING OF A MIRROR TO A SUPPORT

CROSS REFERENCE TO RELATED APPLICATIONS

The present application is a National Phase of International Application Number PCT/FR2021/050814 filed May 11, 2021, which designated the U.S. and claims priority benefits from French Application Number FR2005321 filed May 20, 2020, the entire contents of each of which are hereby incorporated by reference.

TECHNICAL FIELD

This description relates to a fastening system for fastening a mirror to a support, an instrument which incorporates such fastening system, as well as a method for adjusting the instrument.

PRIOR ART

It is well known that the quality of the images formed by an imaging instrument can be degraded by deformations which affect certain optical components of the instrument, such as mirrors, and which are produced unintentionally during assembly of the instrument, or earlier during production of these components. Such degradations in imaging quality result in particular from the step of fastening at least one of the optical components to a support for the component. Indeed, this fastening step is likely to produce constant stresses in the component, which cause deformations of an optical surface of the component. These optical surface deformations, even if they correspond to displacements on the order of 10 nm (nanometers), are responsible for degrading the optical quality of the instrument.

Similarly, it is known that variations in the gravity conditions to which an imaging instrument is subjected can also cause deformations in some of its optical components, and consequently can generate degradations in imaging quality. Such is the case for an imaging instrument, between an initial time when it is assembled on Earth, for example when the instrument is integrated into a satellite, and a mission time when the instrument is used on board the satellite once it is in orbit.

Often, for these two causes of degradation in imaging quality, the degradations are all the more significant when that one among the instrument's optical components that is the object of the unintentional deformations has large dimensions. Thus, when the instrument is a telescope, the primary mirror of this telescope is particularly affected. The main optical aberration of the instrument is then most often astigmatism, but other aberrations such as trefoil may also be generated.

When the optical aberration is produced during assembly of the instrument or during its integration into a carrier structure such as a satellite, the fastening onto its support of one of the optical components of the instrument which is responsible for the degradation in imaging quality, can be restarted with additional precautions to reduce the stresses unintentionally generated. But this results in delays in assembly, which can be very costly, and a gain in imaging quality with each repeated assembly is not guaranteed.

When the optical aberration is produced by a variation in the gravity conditions, the deformations of the optical components caused by this variation can be taken into account when designing these components. However, it is then not possible to optimize the imaging quality of the instrument once its carrier satellite has been placed in orbit.

These difficulties are not limited to an imaging instrument, but in general concern an instrument that comprises at least one mirror, regardless of the instrument's function. Such an instrument generally has a radiation collection function, which may be combined with another function such as using the collected radiation to form an image or to detect a signal transmitted by the collected radiation. In the case of a detection function, the optical aberration produced by deformation of the mirror can be determined for a wavelength which is not within the spectral domain of the radiation concerned by the use of the instrument. Even so, the optical aberration for the wavelength used to determine this aberration characterizes the degradation in quality at which the instrument performs its function.

Technical Problem

Starting from this situation, an object of the present invention is to allow correcting certain deformations which affect a mirror, without requiring that this mirror be disassembled from its support.

A complementary object of the invention is that a correction applied in an attempt to reduce a deformation of the mirror is reversible, in order to allow this correction to be tested and then to be removed if it does not produce the expected improvement in the operation of the instrument.

Another complementary object of the invention is to propose a manner of correcting deformations of a mirror which is compatible with existing mirror fastening systems, preferably without affecting them.

SUMMARY OF THE INVENTION

To achieve at least one of these or other objects, a first aspect of the invention proposes a new fastening system for fastening a mirror to a support of this mirror, which comprises:
  at least three intermediate structures, each intended to be connected to the support by a first interface of the intermediate structure, and to be rigidly connected to the mirror by a second interface of the intermediate structure, so that the at least three intermediate structures together perform a rigid fastening of the mirror to the support, the intermediate structures being angularly distributed around a center of the mirror while being apart from this center.

Preferably, the intermediate structures may produce an isostatic connection between the mirror and its support. In addition, these intermediate structures may be of any type, for example bipod or monopod. In the case of bipod intermediate structures, three structures are required to produce an isostatic connection. Alternatively, six intermediate structures each of the monopod type are required to produce an isostatic connection.

According to the invention, the fastening system further comprises at least one torsion device, each torsion device being dedicated to only one of the intermediate structures and comprising:
  at least one elastic element which has two ends, a first of these ends being connected to the first interface of the intermediate structure, and a second of these ends being rigidly connected to the second interface of the intermediate structure, the elastic element being arranged to apply a torque to the mirror, directly or through the second interface of the intermediate structure; and a variator, which is coupled to the elastic element so as to modify a value of the torque applied to the mirror directly or through the second interface of the intermediate structure.

Within the meaning of the invention, torque which is applied directly to the mirror is understood to mean a configuration where the second end of the elastic element is fixed to the mirror. In a configuration where the torque is applied to the mirror through the second interface of the intermediate structure, the second end of the elastic element may be connected to any element of this second interface.

Thus, the elastic element produces the torque in accordance with a current state of the variator, and transmits this torque to the mirror or to the second interface of the intermediate structure. In the latter case, the torque is applied to the mirror via this second interface of the intermediate structure. In this manner, the invention adds to each intermediate structure, or to at least some of them, in addition to its function of fastening the mirror to the support, a function of transmitting a torque to the mirror. The value of this torque can be adjusted by means of the variator, in a manner which is made easy by the correlation between this value of the torque and an amplitude of the deformation produced by the variator on the elastic element. It is thus possible to adjust the torque applied to the mirror in order to compensate at least partially for an unintentional force or moment that would be applied to the mirror due to its attachment to the support.

A first advantage of the system of the invention comes from the fact that it is not necessary to re-detach the mirror from the support in order to reduce the deformations of the mirror which are caused by its assembly to the support. Indeed, the system of the invention allows an assembly in two successive phases. During the first phase, the mirror is fastened to the support by means of intermediate structures. This fastening may generate stresses in the mirror, and therefore deformations in its optical surface. But during a second phase, which follows the first, each variator can be adjusted in order to apply a torque to the mirror which reduces its deformations. The assembly of the mirror and its support therefore does not need to be disassembled and then reassembled several times to achieve a slight deformation of the mirror. Significant savings in time and labor costs thus result.

A second advantage of the invention arises from the fact that each torsion device has a reversible operation. Thus, each variator can be placed in an initial state to produce a test value for the torque applied to the mirror through the corresponding intermediate structure. Then, if the resulting change to the shape of the mirror does not reduce its deformation as caused by the first assembly phase, the state of the variator can be modified to test another value of the torque. The system of the invention therefore allows progressive and empirical correction of the mirror's deformation.

A third advantage of the invention lies in the fact that it does not require modifying the mirror or the intermediate structures, since each torsion device can be added to one of the intermediate structures by connecting it as a supplement to the support and to the mirror. Designs already available for the mirror, the support, and the intermediate structures can therefore be reused, without requiring new investments in design and in development for these components.

In the fastening system, any number of intermediate structures may be provided with torsion devices according to the invention. In particular, the fastening system may comprise two or three intermediate structures which are each provided with a torsion device independent of those of the other intermediate structure. If two bipod-type intermediate structures, for isostatic fastening of the mirror on its support, are provided with torsion devices, these can compensate for optical aberrations of the mirror of astigmatism type. If the three bipod-type intermediate structures of an isostatic fastening of the mirror on its support are provided with torsion devices, then optical aberrations of the mirror of trefoil type can be compensated for as well.

Preferably, the first end of the elastic element may be connected directly to the first interface of the intermediate structure. However, it may alternatively be connected to the first interface of the intermediate structure by a part of the support which is located between this first interface and a connection point connecting the first end of the elastic element to the support.

Similarly, the second end of the elastic element may be connected directly to the second interface of the intermediate structure. However, it may alternatively be connected to the second interface of the intermediate structure by a part of the mirror which is located between this second interface and a connection point connecting the second end of the elastic element to the mirror.

It is also possible for the connection of the first end of each elastic element to the first interface of the corresponding intermediate structure or to the support, and/or for the connection of the second end of each elastic element to the second interface of the corresponding intermediate structure or to the mirror, to comprise intermediate pieces. In particular, the connection of the first end of each elastic element to the first interface of the corresponding intermediate structure or to the support may comprise at least part of the variator.

In first embodiments of the invention, each elastic element may comprise a strip which extends between the first and the second end of this elastic element. The variator may then be arranged to move the first end so as to produce a bending deformation of the strip, this bending deformation producing, at the second end, the torque which is applied to the mirror. In such first embodiments, a material of the elastic element of each torsion device may be identical to that of the intermediate structure to which this torsion device is dedicated. Having identical material allows the value of the torque to remain the same when the temperature of the fastening system varies. More generally, each variator may have a mechanical operation or an operation based on at least one piezoelectric cell, for moving the first end of the elastic element relative to the support for the mirror. The shape of the elastic element is then not limited to that of a strip. The operation of the variator may be mechanical and suitable for manual actuation. Such manual adjustment may be carried out initially, i.e. before the instrument which comprises the mirror is used for its application, for example before being used during a mission on board a satellite. Alternatively, the variator may be suitable for remote actuation by means of an electrical command sent to this variator. It is then possible to actuate the variator remotely and possibly multiple times during the life of the instrument, in particular while the instrument is on board a satellite in orbit.

In other embodiments of the invention, each elastic element may comprise a thermal deformation bimetallic strip assembly which extends between the first and the second end of this elastic element. The variator can then be suitable for applying a temperature variation to the bimetallic strip assembly, such that this assembly produces, at the second end, the torque which is applied to the mirror in response to the temperature variation.

Generally for the invention, each torsion device may be arranged so that the torque which is applied to the mirror, by being generated by this torsion device, is parallel to a first axis which is directed towards the center of the mirror from a location of the mirror which is closest to the intermediate structure to which this torsion device is dedicated. Such a configuration suits more particularly for correcting optical aberrations of the mirror of astigmatism type.

Alternatively, each torsion device may be arranged so that the torque is parallel to a second axis which is tangent to a peripheral edge of the mirror at a location of the mirror which is closest to the intermediate structure to which this torsion device is dedicated. This other configuration suits in particular for correcting optical aberrations of the mirror of trefoil type.

Also generally for the invention, each intermediate structure may be connected to the mirror by the second interface of this intermediate structure, at the peripheral edge of the mirror. In this case, the second interface is adapted for applying the torque to the peripheral edge of the mirror. However, it is also possible for the second interface of each intermediate structure to be located in the mirror at a distance from its peripheral edge, in particular when the mirror is large.

A second aspect of the invention provides a radiation collecting or optical instrument which comprises a mirror, a support, and a fastening system which is in accordance with the first aspect of the invention. The fastening system then rigidly connects the mirror to the support, within the instrument.

Such instrument may form a telescope. In this case, the mirror which is connected to the support by the fastening system may advantageously be the primary mirror of the telescope. Indeed, the primary mirror of a telescope is usually the largest one in the telescope, and in which unintentional deformations degrade the optical operation of the telescope the most. However, the invention may also be applied to mirrors of a telescope other than its primary mirror.

Finally, a third aspect of the invention relates to a method for adjusting a radiation collecting or optical instrument, wherein this instrument comprises a mirror, a support, and a fastening system which is in accordance with the first aspect of the invention. The mirror is rigidly fastened to the support by means of intermediate structures of the instrument. The method of the invention comprises executing at least once a sequence which comprises the following steps:
/1/ characterizing at least one optical aberration of the instrument which at least partially results from a deviation in a shape of the mirror, relative to a reference shape identified for this mirror; and
/2/ for at least one of the intermediate structures, adjusting the variator of the torsion device which is dedicated to this intermediate structure, so as to reduce the at least one optical aberration of the instrument.

The optical aberration that is reduced by executing step /2/ may comprise at least an astigmatism of the instrument, a trefoil of the instrument, or a combination of astigmatism and trefoil of the instrument. Other, higher-order optical aberrations may also be reduced in this manner.

The radiation collecting or optical instrument may be installed on board a satellite when this method of the invention is implemented. In this case, the sequence comprising steps /1/ and /2/ may be executed during integration of the instrument into the satellite, on Earth before launching the satellite. Alternatively, the sequence comprising steps /1/ and /2/ may be executed or repeated on board the satellite after it has been placed in orbit around the Earth.

BRIEF DESCRIPTION OF FIGURES

The features and advantages of the invention will become more clearly apparent from the following detailed description of some non-limiting embodiments, with reference to the appended figures, in which:

FIG. 1a is a partial perspective view of an instrument which corresponds to a first embodiment of the invention, in which the elastic element is a strip which is perpendicular to a peripheral edge of the mirror;

FIG. 1c is a further enlargement showing the torsion device within the intermediate structure of FIG. 1b;

DETAILED DESCRIPTION OF THE INVENTION

For clarity sake, the dimensions of the elements represented in these figures correspond neither to actual dimensions nor to actual dimension ratios. Furthermore, identical references indicated in different figures designate elements which are identical or which have identical functions.

FIG. 1a shows certain elements or parts of elements of an instrument according to the invention. This instrument, which may be a telescope, comprises a support 1 and a mirror 2. The mirror 2, which may be the primary mirror of the telescope, may have a circular peripheral edge, designated with the reference B. The reference C designates the location of a center of the mirror 2. Depending on the design of the instrument, the mirror 2 may have a central opening, and the center C may then be located within this central opening. For example, the mirror 2 may be made of silicon carbide (SiC), and its radius may be on the order of several tens of centimeters.

The support 1 may be made of an alloy based on titanium (Ti) and/or aluminum (Al), for example. Its dimensions may be adapted so that the mirror 2 is fastened to the support 1 at several locations on the edge B, for example at three locations which are each separated from their neighbors by approximately 120° (degrees) around the center C. However, such an angular distribution of the locations for fastening the mirror 2 to the support 1 is not essential. Indeed, it is sufficient that the distribution of the locations for fastening the mirror 2 to the support 1 provides the mirror with sufficient stability, and reduces vibrations which could affect the mirror and/or the support.

Figure 1B:
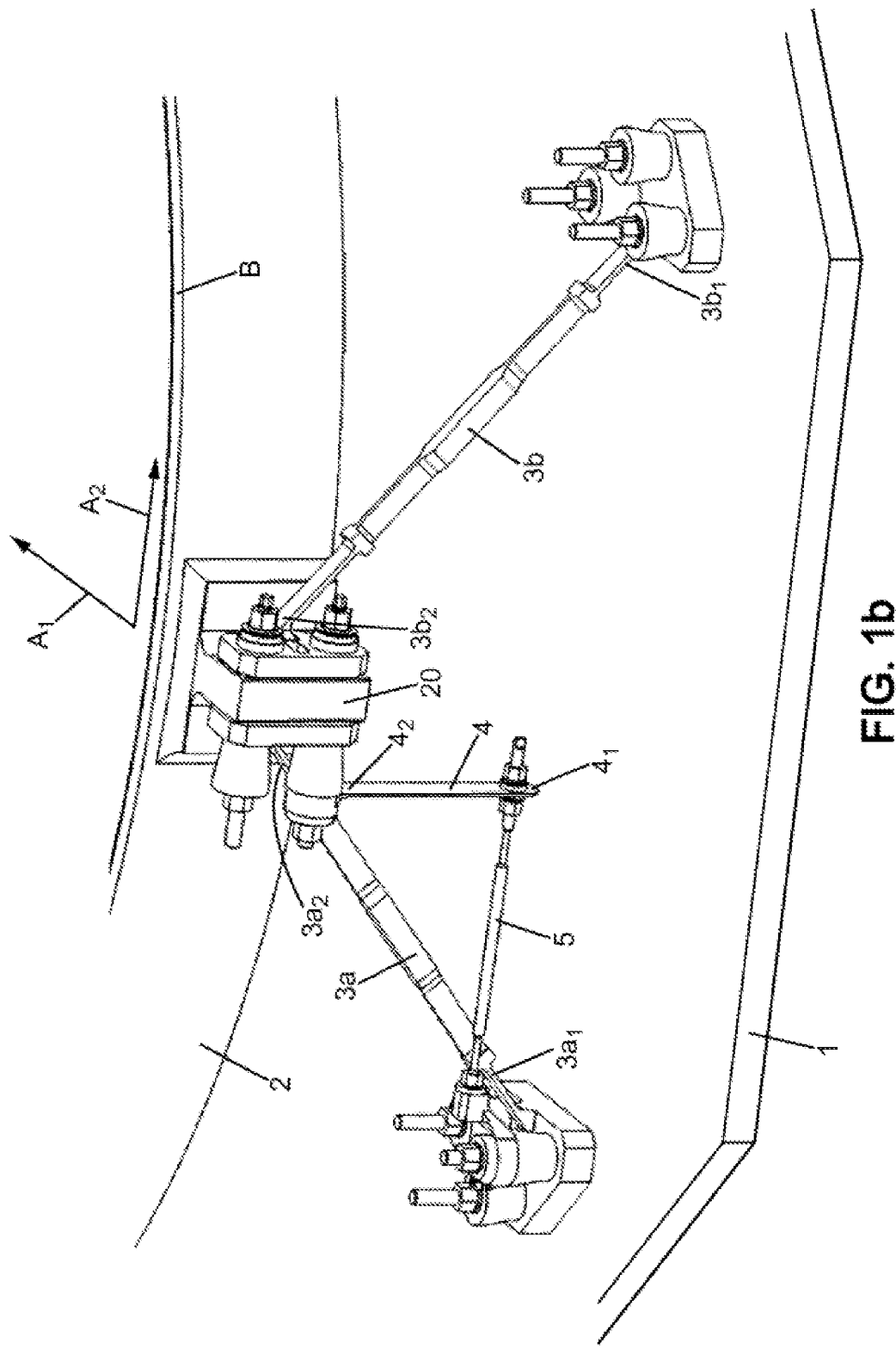
FIG. 1b is an enlargement showing an intermediate structure of the instrument of FIG. 1a, with the associated torsion device.

The "3" reference numbers each designate an intermediate structure which connects the mirror 2 to the support 1, all of them together forming a rigid connection of the mirror to the support. Preferably, the number and the design of the intermediate structures 3 are chosen so as to form an isostatic connection. For example, three intermediate structures 3 may be used, each being of the bipod type. Thus, each intermediate structure 3 may comprise two rigid segments, designated by 3a and 3b. The two segments 3a and 3b of a same bipod-type intermediate structure 3 each connect a common location of the edge B of the mirror 2 to two locations of the support 1 that are distanced from each other. In this manner, each intermediate structure 3 forms a triangle, which is isosceles when its two segments 3a and 3b have identical lengths. The materials of segments 3a and 3b can be adapted according to mechanical and thermal criteria. For example, segments 3a and 3b may be made of an alloy based on iron (Fe) and nickel (Ni), known by the name INVAR®. As can be seen in FIG. 1b and FIG. 1c, the two ends of each segment 3a are designated by the references $3a_1$ and $3a_2$. Similarly, the two ends of each segment 3b are designated by the references $3b1$ and $3b_2$. In each intermediate structure 3, the ends of segments $3a_1$ and $3b_1$ are connected to the support 1 at a distance from each other in order to form a bipod. For example, these segment ends $3a_1$ and $3b_1$ are each connected to the support 1 using a bolt and nut type of assembly. For this example of an intermediate structure, the segment ends $3a_1$ and $3b_1$ form the first interface of the intermediate structure 3, which is intended to be connected to the support 1 when the instrument is assembled. The segment ends $3a_2$ and $3b_2$ are rigidly connected to the edge B of the mirror 2, at the same location on this edge B. For example, they may be bolted together to a fastening bracket 20 which is integrated into the mirror 2 at its peripheral edge B. The segment ends $3a_2$ and $3b_2$ in a same intermediate structure 3 form the second interface of this intermediate structure, which is intended to be connected to the mirror 2 when the instrument is assembled. All the intermediate structures 3 used to connect the mirror 2 to the support 1 may be identical, but this is not essential to implementing the invention.

According to the invention, a torsion device is added to at least one of the intermediate structures 3. Preferably, such a torsion device is added separately to each of the intermediate structures 3. It may be designed to produce a torque, or a non-zero torque component, which is parallel to one of the axes $A_1$ or $A_2$, this torque being evaluated at the second interface of the corresponding intermediate structure 3. $A_1$ is an axis which connects this second interface of the intermediate structure to the center C of the mirror 2, being directed towards the center C, and $A_2$ is an axis which is tangent to the peripheral edge B of the mirror 2 at the location of the intermediate structure concerned. For example, the axis $A_2$ may be oriented in the forward direction, also called the trigonometric or counterclockwise direction, around the reflecting surface of the mirror 2. Each torsion device is adapted to produce torque such that this torque is in the same direction as axis $A_1$ or $A_2$, or in the opposite direction, or such that the torque component along axis $A_1$ or $A_2$ is positive or negative.

Each torsion device comprises an elastic element 4, having two opposite ends which are designated by the references $4_1$ and $4_2$, and a variator 5. In certain embodiments, such as the one shown in FIG. 1a-FIG. 1c, the variator 5 may connect end $4_1$ of the elastic element 4 to the support 1, or to a location in the corresponding intermediate structure 3 which is close to the support 1. Preferably, the variator 5 may connect end $4_1$ of the elastic element 4 to the first interface of the intermediate structure 3. In other embodiments, end $4_1$ of the elastic element 4 may be connected to the support 1, or to the first interface of the intermediate structure 3, independently of the variator 5, and the variator 5 may be designed to generate a controlled deformation of the elastic element 4. FIG. 3 shows another such embodiment, which will be presented below. In all cases, the second end $4_2$ of the elastic element 4 is rigidly connected to the second interface of the intermediate structure 3. For example, end $4_2$ of the elastic element 4 and the ends of segments $3a_2$ and $3b_2$ may be bolted together to the mirror 2. The variator 5 is designed to control the torque so that it is in the same direction as axis $A_1$ or $A_2$, or in the opposite direction, or has a positive or negative component along axis $A_1$ or $A_2$, when this torque is evaluated at the second interface of the intermediate structure 3 concerned. In the embodiments which are now described in detail with reference to FIG. 1-FIG. 3, the elastic element 4 has an elongated shape between its two ends $4_1$ and $4_2$, but such a shape is not essential and those skilled in the art will know how to identify alternative shapes which are also capable of producing torques for which the values are controllable, and which have suitable elastic features.

In the embodiment of FIG. 1a-FIG. 1c, the rigid connection between the strip which forms the elastic element 4 and the mirror 2 is designed so that the strip is oriented substantially perpendicular to the edge B of the mirror 2, and the variator 5 is a tie bar of adjustable length which connects end $4_1$ of the strip to a point which is fixed relative to the support 1. The tie bar which constitutes the variator 5 can then be oriented substantially parallel to the edge B, when no torque is produced. For example, the tie bar may be composed of two male threaded segments $5_1$ and $5_2$, and a female threaded tube $5_3$ into which the male threaded segments $5_1$ and $5_2$ can screwed to a greater or lesser extent. Thus, rotation of the threaded tube $5_3$, which may be performed manually by an operator for example, produces an elongation or a shortening of the tie bar depending on the direction of rotation and the number of turns. Male threaded segment $5_1$ is connected to the support 1, and male threaded segment $5_2$ is connected to end $4_1$ of the elastic element 4, for example using a combination of concave and convex washers. When the tie bar which forms the variator 5 is lengthened or shortened, it imposes a curvature on the strip which forms the elastic element 4, with a resulting torque at end $4_2$. For the embodiment represented, this torque is parallel to axis $A_1$, and is at least partially applied to the edge B of the mirror 2. It then causes a local deformation of the reflecting surface of the mirror 2, which has a rotational component around axis $A_1$ in the vicinity of the intermediate structure 3 concerned. This local rotational component makes it possible to compensate for an optical aberration of the mirror 2 which could be caused by the locking of the second interface of the intermediate structure 3 on the bracket 20 of the mirror 2. For such an embodiment of the invention, the strip of the elastic element 4 and the tie bar of the variator 5 may advantageously be composed of the same alloy as segments 3a and 3b of each intermediate structure 3. Indeed, under these conditions, the value of each torque which is applied to the mirror 2 can be substantially independent of the temperature at which the instrument is used, or can have a reduced dependency on this temperature.

Figure 2:
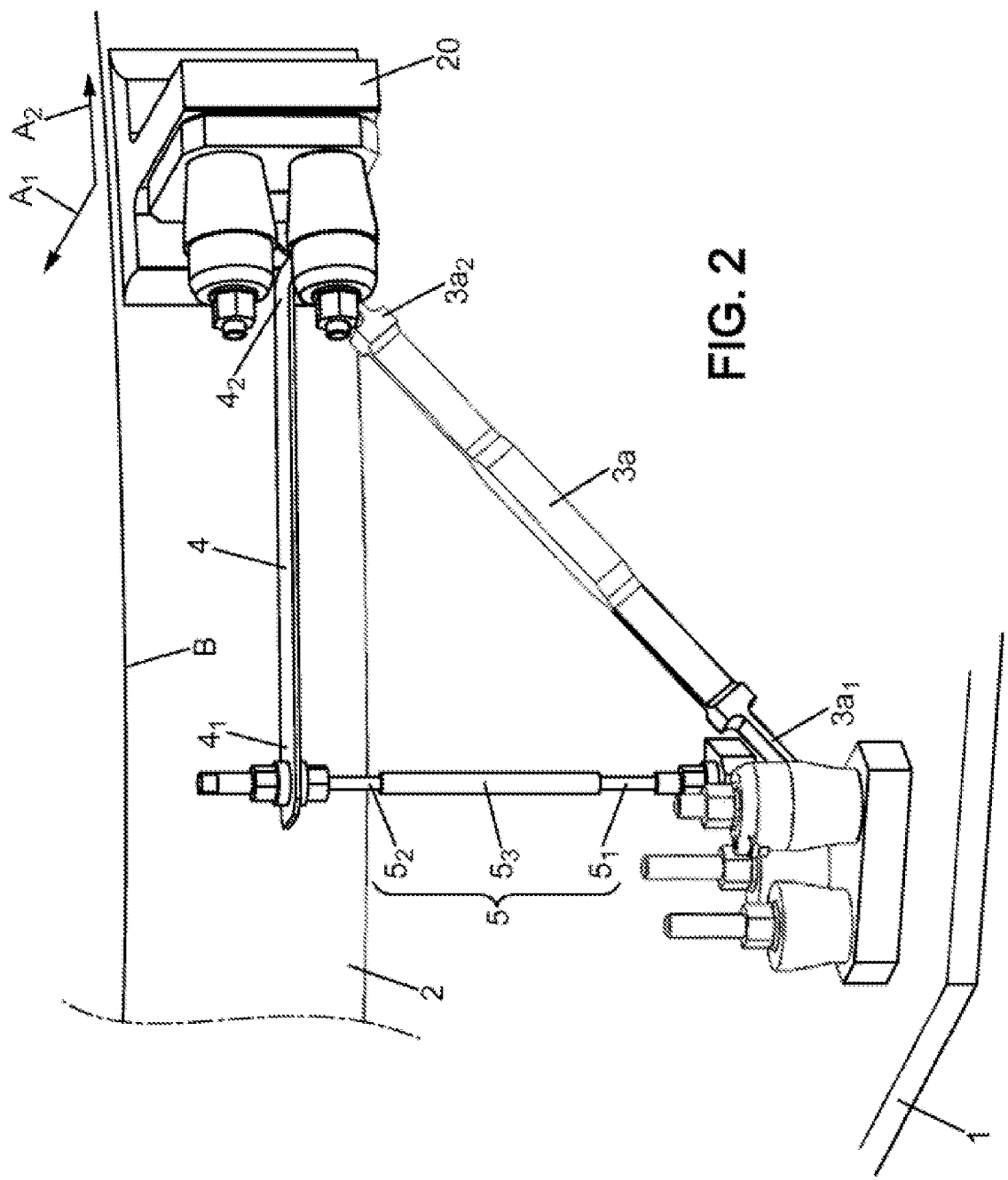
FIG. 2 shows a second embodiment of the invention, in which the elastic element is a strip which is parallel to a peripheral edge of the mirror.
Figure 3:
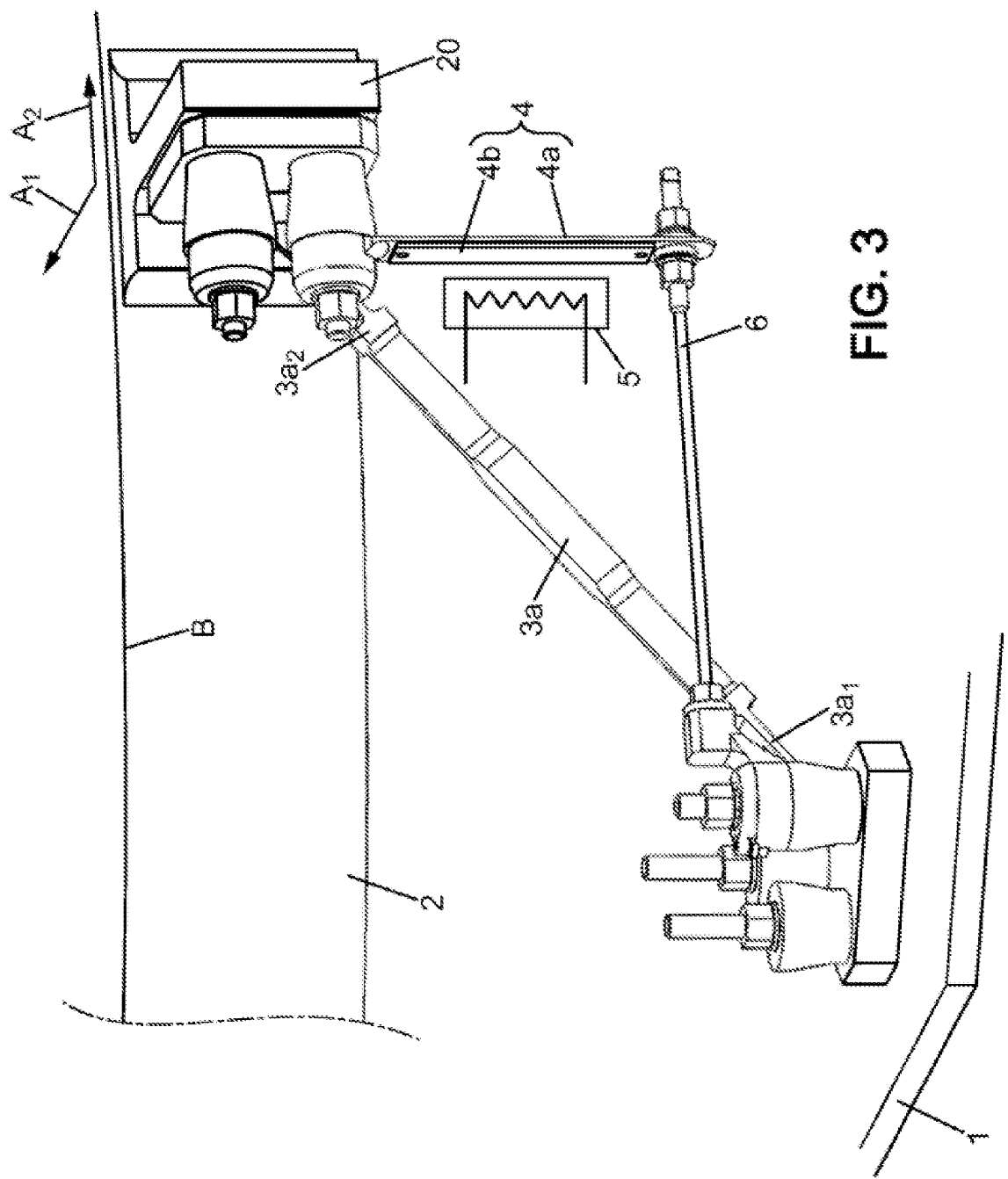
FIG. 3 shows a third embodiment of the invention, in which the elastic element is a thermal deformation bimetallic strip assembly.

FIG. 2 corresponds to FIG. 1c for another arrangement of the strip of the elastic element 4 and of the tie bar of the variator 5: the strip is substantially parallel to the edge B of the mirror 2 at the location of the intermediate structure 3 considered, and the tie bar may be oriented substantially perpendicular to the edge B, when no torque is produced. The operation of the torsion device is then similar to what has been described in connection with FIG. 1c.

The use of a tie bar as described above is suitable for an optical aberration compensation operation which is carried out manually by an operator. Such embodiments are therefore suitable for instruments which are accessible to an operator at the time the operation is performed. Such is the case for a telescope which is installed on board a satellite, and for which the optical aberration compensation operation is carried out on Earth, for example during integration of the satellite.

In other embodiments of the invention, the manually operated tie bar which forms the variator 5 may be replaced by an electrically controlled tie bar, which may for example incorporate a stepper motor. In this case, each torsion device may further comprise part of a controller (not shown), which makes it possible to control the length of the tie bar. Such other embodiments can allow adjusting the value of each torque remotely, including once the satellite carrying the instrument has been placed in orbit.

FIG. 3 shows yet another possible embodiment of the invention, in which the elastic element 4 is composed of a bimetallic strip assembly which extends between ends $4_1$ and $4_2$. Such bimetallic strip assemblies are known to those skilled in the art, and are composed of two strips of different alloys, which are rigidly connected to each other at ends $4_1$ and $4_2$. The two strips are designated by the references 4a and 4b. The respective alloys of the two strips 4a and 4b are selected to have different values for their coefficient of thermal expansion. Their common end $4_2$ is still rigidly connected to the mirror 2, and their other common end, corresponding to reference $4_1$, may be connected to a point which is fixed relative to the support 1 by a rod 6 of constant length. Thus, the variator 5 may be composed of a heating system which is arranged to vary the temperature of the bimetallic strip assembly 4a-4b. In particular, it may comprise at least one heating element, for example based on at least one electrical resistor or one radiating element. When this heating element is activated, the bimetallic strip assembly 4a-4b deforms by bending and bearing against the end of the rod of constant length 6. It then produces, by reaction, a torque at end $4_2$. In FIG. 3, the solid-line representation of the bimetallic strip assembly 4a-4b can correspond to the application to the mirror 2 of a torque of a determined value and sign, and the dotted lines indicated for the bimetallic strip assembly 4a-4b can correspond to the application to the mirror 2 of another value for the torque, with a sign which may be the opposite sign.

Figure 4:
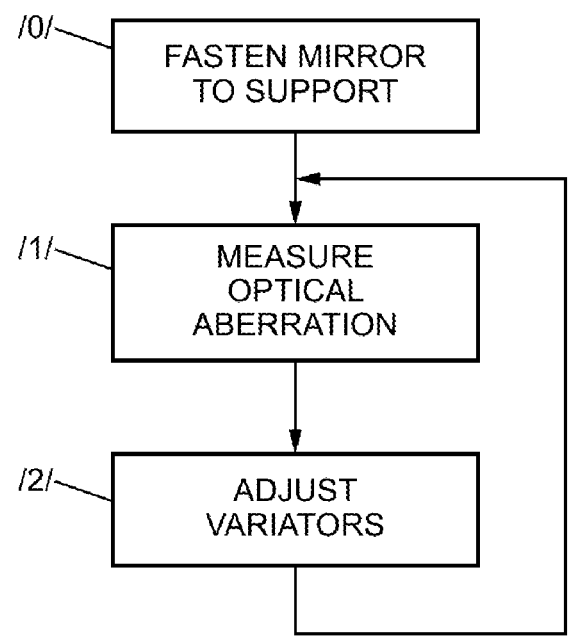
FIG. 4 is a diagram of the steps of a method according to the invention, for adjusting an instrument which comprises a mirror.

The implementation of the torsion devices is now described with reference to FIG. 4. The mirror 2 has been rigidly fastened to the support 1 by means of the intermediate structures 3 during a preliminary step, denoted /0/. This step /0/ is performed on Earth, for example when integrating the telescope into a satellite. Steps /1/ and /2/ of the method of the invention may then also be carried out on Earth, for example during additional steps of integrating the telescope into the satellite. Alternatively, steps /1/ and /2/ may be performed under the conditions of use of the telescope, i.e. once the satellite has been placed in orbit. The adjustments which are then applied to the variators 5 directly take into account the actual conditions of use of the telescope, in particular the intensity of the gravitational field which is in effect during this use.

Step /1/ consists of characterizing at least one optical aberration of the telescope, for example astigmatism, which results from a difference between the actual shape of the mirror 2 and its nominal shape. However, other optical aberrations of the telescope may be characterized alternatively or in addition to astigmatism, such as trefoil aberrations. Several methods may be used for these characterizations of optical aberrations, which are known to those skilled in the art so it is not necessary to repeat them in this description. For example, specific devices may be used to characterize the shape of the wave front which results from the reflection on the mirror 2 of radiation from a distant source.

A calculation unit (not shown) can then determine the deformations of the mirror 2 to be produced by the torsion devices described above, in order to compensate at least partially for some of the optical aberrations which have been characterized in step /1/. The calculation unit then determines the values of the torques which are necessary to generate these deformations, then the length modifications to be applied to the elastic elements 4 of FIG. 1a-FIG. 1c or FIG. 2 to produce these torque values. For the embodiment of FIG. 3, the calculation unit determines the temperature of each bimetallic strip assembly 4a-4b, which is necessary to produce the desired torque value. Finally, in step /2/, the variators 5 are adjusted manually or by dedicated commands, according to the values determined by the calculation unit.

It is possible for the sequence of steps /1/ and /2/ to be repeated one or more times in order to gradually improve the compensation for the optical aberrations of the telescope.

Typically, each torque to be applied may be on the order of a few Newton-meters (N·m), or less than 1 N·m. It is thus possible to rotate the optical surface of the mirror 2 by a few tens of nanometers (nm) locally, in the vicinity of each intermediate structure 3, about a direction which is parallel to the optical surface of the mirror.

It is understood that the invention may be reproduced by modifying secondary aspects of the embodiments described in detail above, while retaining at least some of the advantages cited. In particular, each intermediate structure, the elastic element, and the variator for each torsion device may have different designs and configurations from those shown in the figures. Similarly, the mirror to which the invention is applied may have no central opening, all the cited materials have been cited only as non-limiting examples and may be changed depending on the design of the instrument, and any cited numerical values again have been cited for illustrative purposes only and may be changed depending on the application considered. Finally, the instrument to which the invention is applied may have any function, and may be intended for any conditions of use, not necessarily on board a satellite. For example, it may be intended to collect radiofrequency radiation, and may be installed on Earth while being supported by a fixed structure.

The invention claimed is:

1. A fastening system for fastening a mirror to a support of said mirror, comprising the following components:
    at least three intermediate structures, each configured to be connected to the support by a first interface of the intermediate structure, and to be rigidly connected to the mirror by a second interface of the intermediate structure, so that the at least three intermediate structures perform together a rigid fastening of the mirror to the support, the intermediate structures being angularly distributed around a center of the mirror while being apart from said center,
    wherein the fastening system further comprises at least one torsion device, each torsion device being dedicated to only one of the intermediate structures and comprising:
        at least one elastic element, which has two ends, a first of said ends being connected to the first interface of the intermediate structure, and a second of said ends being rigidly connected to the second interface of said intermediate structure, the elastic element being arranged to apply a torque to the mirror, directly to said mirror or through the second interface of the intermediate structure;
a variator, which is coupled to the elastic element so as to modify a value of the torque applied to the mirror directly or through the second interface of the intermediate structure;
wherein each elastic element comprises a strip which extends between the first and the second end of said elastic element, and
wherein the variator is configured to move the first end so as to produce a bending deformation to the strip, the bending deformation producing, at the second end, the torque which is applied to the mirror.

2. The fastening system according to claim 1, wherein a material of the elastic element of each torsion device is identical to a material of the intermediate structure to which said torsion device is dedicated.

3. The fastening system according to claim 1, wherein each variator has a mechanical operation or an operation based on at least one piezoelectric cell, for moving the first end of the elastic element relative to the support.

4. The fastening system according to claim 3, wherein each variator has a mechanical operation suitable for manual actuation, or said variator is suitable for remote actuation by means of an electrical command sent to said variator.

5. The fastening system according to claim 1, comprising two or three intermediate structures which are each provided with a torsion device independent of the torsion device of each other intermediate structure.

6. The fastening system according to claim 1, wherein each intermediate structure is connected to the mirror by the second interface of said intermediate structure, at a peripheral edge of the mirror, and said second interface is adapted for applying the torque to the peripheral edge of the mirror.

7. A radiation collecting or optical instrument, comprising the mirror, the support, and the fastening system according to claim 1, said fastening system rigidly connecting the mirror to the support.

8. The optical instrument according to claim 7, forming a telescope, and wherein the mirror which is connected to the support by the fastening system is a primary mirror of the telescope.

9. A method for adjusting a radiation collecting or optical instrument, wherein said instrument comprises the mirror, the support, and the fastening system according to claim 1,
the mirror being rigidly fastened to the support by means of intermediate structures,
the method comprising executing at least once a sequence which comprises the following steps:
1) wherein at least one optical aberration of the instrument which at least partially results from a deviation in a shape of the mirror, relative to a reference shape identified for said mirror; and
2) For at least one of the intermediate structures, adjusting the variator of the torsion device which is dedicated to said intermediate structure, so as to reduce said at least one optical aberration of the instrument.

10. The method according to claim 9, wherein the optical aberration that is reduced by executing step (2) comprises at least an astigmatism of the instrument, a trefoil of the instrument, or a combination of astigmatism and trefoil of the instrument.

11. The method according to claim 9, wherein the radiation collecting or optical instrument is installed on board a satellite, and wherein the sequence which comprises steps 1) and 2) is executed during an integration of the instrument into the satellite, on Earth before launching said satellite, and/or executed or repeated on board the satellite after said satellite has been placed in orbit around the Earth.

12. A fastening system for fastening a mirror to a support of said mirror, comprising the following components:
at least three intermediate structures, each configured to be connected to the support by a first interface of the intermediate structure, and to be rigidly connected to the mirror by second interface of the intermediate structure, so that the at least three intermediate structures perform together a rigid fastening of the mirror to the support, the intermediate structures being angularly distributed around a center of the mirror while being apart from said center,
wherein the fastening system further comprises at least one torsion device, each torsion device being dedicated to only one of the intermediate structures and comprising:
at least one elastic element, which has two ends, a first of said ends being connected to the first interface of the intermediate structure, and a second of said ends being rigidly connected to the second interface of said intermediate structure, the elastic element being arranged to apply a torque to the mirror, directly to said mirror od through the second interface of the intermediate structure;
a variator, which is coupled to the elastic element so as to modify a value of the torque applied to the mirror directly or through the second interface of the intermediate structure, wherein the variator is configured to move the first end of the elastic element to produce a bending deformation of the elastic element; and,
wherein each torsion device is arranged so that the torque which is applied to the mirror, by being generated by said torsion device, is parallel to a first axis which is directed towards the center of the mirror, or is parallel to a second axis which is tangent to a peripheral edge of the mirror at a location of the mirror which is closest to the intermediate structure to which said torsion device is dedicated.

13. A fastening system for fastening a mirror to a support of said mirror, comprising the following components: at least three intermediate structures, each configured to be connected to the support by a first interface of the intermediate structure, and to be rigidly connected to the mirror by a second interface of the intermediate structure, so that the at least three intermediate structures perform together a rigid fastening of the mirror to the support, the intermediate structures being angularly distributed around a center of the mirror while being apart from said center, wherein the fastening system further comprises at least one torsion device, each torsion device being dedicated to only one of the intermediate structures and comprising: at least one elastic element, which has two ends, a first of said ends being connected to the first interface of the intermediate structure, and a second of said ends being rigidly connected to the second interface of said intermediate structure, the elastic element being arranged to apply a torque to the mirror, directly to said mirror or through the second interface of the intermediate structure; a variator, which is coupled to the elastic element so as to modify a value of the torque applied to the mirror directly or through the second interface of the intermediate structure, wherein the variator is configured to move the first end of the elastic element to produce a bending deformation of the elastic element, wherein each elastic element comprises a thermal deformation bimetallic strip assembly which extends between the first and the second end of said elastic element, and the variator is adapted for applying a temperature variation to the bimetallic strip assembly, such that said bimetallic strip assembly produces, at the second end, the torque which is applied to the mirror in response to the temperature variation.

* * * * *